R. MÜLLER.
GAS BURNER FOR COKE OVENS.
APPLICATION FILED NOV. 2, 1909.
982,983.
Patented Jan. 31, 1911.
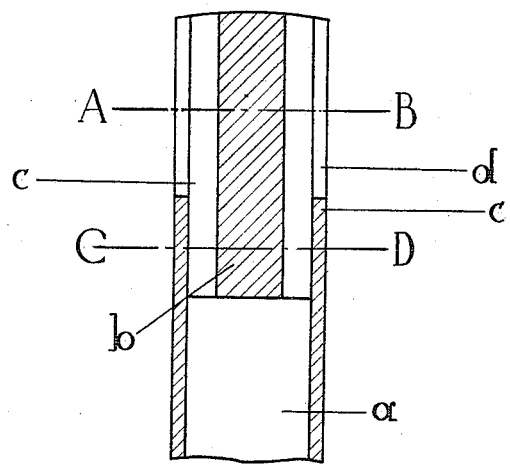
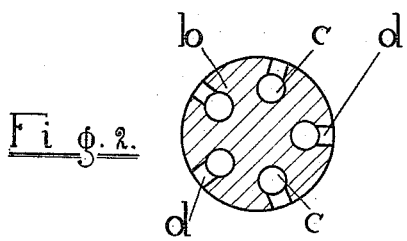
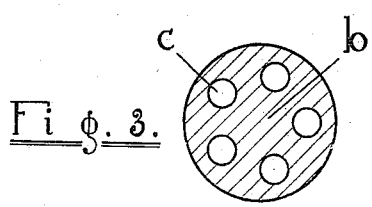
WITNESSES:
John Murtagh
J. A. Cook
INVENTOR
Robert Müller
BY
ATTORNEYS.

UNITED STATES PATENT OFFICE.

ROBERT MÜLLER, OF ESSEN-ON-THE-RUHR, GERMANY.

GAS-BURNER FOR COKE-OVENS.

982,983. Specification of Letters Patent. Patented Jan. 31, 1911.

Application filed November 2, 1909. Serial No. 525,890.

*To all whom it may concern:*

Be it known that I, ROBERT MÜLLER, a subject of the German Emperor, and residing at Essen-on-the-Ruhr, Germany, have invented certain new and useful Improvements in Gas-Burners for Coke-Ovens, of which the following is a specification.

My invention relates to coke-oven twyers, and a primary object is to provide an improved burner-head for the same.

In horizontal coke-ovens gas for producing a high temperature is supplied to the combustion chamber through twyers constructed on the Bunsen principle. The defect is met with, however, that the gas and air are not mixed well but both flow from the twyers in separate jets.

According to my invention I bring about an intimate mixture of gas and air and a good distribution of the combustible mixture by means of a special burner-head. To this end I provide the burner-head with a number of long ducts which are open laterally at their upper ends for a certain length, so that the gases first mix and the mixture then emits in fan-like jets.

One illustrative embodiment of my invention is represented by way of example in the accompanying drawing, wherein:

Figure 1 is a vertical longitudinal section through my improved burner-head, and Figs. 2 and 3 are cross-sections in the planes A—B and C—D, respectively.

Referring to the drawing, $a$ designates the burner-head which can be connected in optional manner with the mixing tube and is closed at its top end by solid material $b$. This is traversed by ducts $c$ of optional cross-section, the top portions of which communicate laterally for a certain length through openings $d$ in the burner-head with the chamber containing the same.

The number, shape, size and distribution of the ducts $c$ depend on the conditions in each case, the kind of gases to be burned and the size of the burner-head. Also the material of which the burner-head is made may be correspondingly optional if it be fireproof, as *e. g.* clay, or non-combustible as *e. g.* metal is, and so on. This burner is at the bottom of the coke-oven and gas is passed up through the mixing tube in which it receives a quantity of air according to the Bunsen principle, after which the mixture passes up through the ducts $c$ and out at the openings $d$.

I claim:—

1. A burner head for coke-ovens comprising a tubular portion, and a solid portion closing the end of the tubular portion, said solid portion being provided with longitudinal ducts having longitudinal lateral openings therein, said solid portion entirely closing the end of said tubular portion, except for said ducts having the lateral openings.

2. A burner head for coke-ovens comprising an upwardly projecting vertical tubular portion, and a solid portion in the upper end of the tubular portion and provided with a series of vertical ducts extending parallel to and near the inner face of said tubular portion, each duct being provided with an elongated vertically disposed opening extending outwardly through said portions and establishing communication between the ducts and the space around the head, and opening freely and directly into said space, said tubular portion being entirely closed except for said ducts having the openings.

In testimony, that I claim the foregoing as my invention, I have signed my name in presence of two subscribing witnesses.

ROBERT MÜLLER. [L. S.]

Witnesses:
OTTO KÖNIG,
CHAS. J. WRIGHT.